US012764050B1

(12) United States Patent
Leventer

(10) Patent No.: US 12,764,050 B1
(45) Date of Patent: Oct. 13, 2026

(54) DISTRIBUTED ACCESS ARCHITECTURE (DAA) SERVICE VERIFICATION

(71) Applicant: Harmonic, Inc., San Jose, CA (US)

(72) Inventor: Amir Leventer, Kfar Saba (IL)

(73) Assignee: Harmonic, Inc., San Jose, CA (US)

( * ) Notice: Subject to any disclaimer, the term of this patent is extended or adjusted under 35 U.S.C. 154(b) by 579 days.

(21) Appl. No.: 17/990,563

(22) Filed: Nov. 18, 2022

Related U.S. Application Data

(60) Provisional application No. 63/280,959, filed on Nov. 18, 2021.

(51) Int. Cl.
*H04L 43/55* (2022.01)

(52) U.S. Cl.
CPC .................................... *H04L 43/55* (2022.05)

(58) Field of Classification Search
CPC ....... H04L 43/55; H04L 43/0811; H04L 5/14; H04L 5/1423; H04L 5/005; H04L 45/28; H04L 45/22
USPC .......................................................... 370/252
See application file for complete search history.

(56) References Cited

U.S. PATENT DOCUMENTS 6,839,350 B1 * 1/2005 Inouchi ................. H04W 99/00 370/335
8,601,133 B1 * 12/2013 Rainovic ............... H04L 61/103 709/227
2005/0102391 A1 * 5/2005 Ruutu ................. H04L 43/0864 709/224
2008/0008183 A1 * 1/2008 Takagaki ................ H04L 45/00 370/392
2010/0177784 A1 * 7/2010 Asati ................... H04L 12/4633 370/463
2011/0134938 A1 * 6/2011 Campos .................... H04J 4/00 370/474
2013/0070765 A1 * 3/2013 Chapman ........... H04N 21/2221 370/390
2015/0092531 A1 * 4/2015 Bernstein ................ H04L 67/10 370/254
2015/0295838 A1 * 10/2015 Liu ....................... H04J 3/0667 370/235
2018/0192327 A1 * 7/2018 Gaydos ............. H04W 72/0446
2019/0052559 A1 * 2/2019 Velayudhan ............ H04L 45/28
2019/0132022 A1 * 5/2019 Jung .................... H04B 17/345
2019/0327499 A1 * 10/2019 Poli .................... H04N 21/2353
2019/0372857 A1 * 12/2019 Gandhi ............... H04L 41/0826
2021/0152386 A1 * 5/2021 Chari ...................... H04L 45/22
2021/0175991 A1 * 6/2021 Neugeboren ......... H04J 3/0667
2021/0226910 A1 * 7/2021 Ranpise .............. H04L 61/2592
2021/0351899 A1 * 11/2021 Shelby ...................... H04L 5/14

(Continued)

*Primary Examiner* — Thuong Nguyen
(74) *Attorney, Agent, or Firm* — Brokaw Patent Law, PC; Christopher J. Brokaw

(57) ABSTRACT

Performing a service assurance test in a Distributed Access Architecture (DAA). A Distributed Access Architecture Switch (DAAS) is disposed upstream from a Remote PHY Device (RPD). The DAAS performs the service assurance test to verify a level of service presently provided to a MAC domain. To do so, the DAAS moves the RPD to the MAC domain using an Internet Protocol (IP) tunnel, the DAAS performs the service assurance test on the MAC domain using the RPD, and thereafter the DAAS may modify the IP tunnel to cause the RPD to cease being on the MAC domain. In this way, the DAAS may perform a service assurance test on a plurality of RPDs that are each disposed on a different MAC domain.

18 Claims, 3 Drawing Sheets

(56) References Cited

U.S. PATENT DOCUMENTS

| | | | | |
|---|---|---|---|---|
| 2021/0360319 | A1* | 11/2021 | Chari | H04L 12/2869 |
| 2022/0011841 | A1* | 1/2022 | Wee | G06F 1/30 |
| 2022/0255861 | A1* | 8/2022 | Smith | H04L 12/2859 |
| 2022/0303210 | A1* | 9/2022 | Wheelock | H04L 45/566 |
| 2022/0405113 | A1* | 12/2022 | Korud | H04L 47/10 |
| 2024/0080221 | A1* | 3/2024 | Smith | H04L 12/2861 |

* cited by examiner

DISTRIBUTED ACCESS ARCHITECTURE (DAA) SERVICE VERIFICATION

CLAIM OF PRIORITY

This application claims priority to U.S. Provisional Patent Application Ser. No. 63/280,959, filed Nov. 18, 2021, entitled "DAA E2E Service Assurance," the contents of which are hereby incorporated by reference for all purposes as if fully set forth herein.

FIELD OF THE INVENTION

Embodiments of the invention relate to performing a service assurance test in a Distributed Access Architecture (DAA).

BACKGROUND

Cable operators and other streaming content providers often have need to verify the level of service that is presently being provided to customers. This need may arise from contractual obligations or simply from a desire to understand the real-world behavior of their network so that any problems may be readily identified and addressed. To address this need, cable operators and other streaming content providers commonly perform one or more tests collectively referred to herein as "service assurance tests."

Service assurance tests typically include speed tests and latency tests performed on a selected and isolated MAC Domain (MD) for purposes of identifying any MAC or networking issues presently existing with that MD. A MD is a logical association that is used when providing Data Over Cable Service Interface Specification (DOCSIS) functions for a set of channels. A typical MD comprises one downstream (DS) channel and four or more upstream (US) channels. A MD comprises at least one downstream (DS) port of a Cable Modem Termination System (CMTS) and at least one upstream (US) port of the CMTS.

Service assurance tests may be performed periodically (for example, every hour) or on demand (for example, in response to a subscriber call). Service assurance tests may be performed to ensure that a particular MD is working within acceptable operational parameters, e.g., one test may be to ensure that a MD has sufficient capacity for the anticipated load and another test may be to ensure that the MD is exhibiting acceptable speed.

FIG. 1 is an illustration of a legacy cable architecture upon which a service assurance test might be performed according to the prior art. FIG. 1 depicts a portion of the legacy cable architecture located at a cable head end 110 and another portion of the legacy cable architecture located outside plant 160. Cable head end 110 refers to the facilities of the cable operator. The illustrative cable head end 110 of FIG. 1 comprises a Cable Modem Termination System (CMTS) 120, a Radio Frequency (RF) Splitter and Combiner 122, and optical transmitters 130, 132, and 134. CMTS 120 operates using a plurality of MAC domains; in the example of FIG. 1, MAC domains 112, 114, and 116 are depicted, although in actual deployments a large number of MAC domains will typically be used.

Outside plant 160 refers to the physical cabling and infrastructure residing outside cable head end 110 that extends to the customer premises equipment (CPE). For example, FIG. 1 depicts fiber nodes 170, 180, and 190 and sets of cable modems (CM) 172, 182, and 192 in outside plant 160. A typical cable modem deployed in the field will provide service to one or more CPEs, such as a computer, cell phone, or television. A particular fiber node will typically provide service to multiple cable modems, e.g., as shown in FIG. 1, fiber node 170 services set of cable modems 172, fiber node 180 services set of cable modems 182, and fiber node 190 services set of cable modems 192.

Previously, service assurance tests were performed by locating a particular cable modem (CM) and connecting that CM to a particular MD upon which service assurance tests are to be performed. Thereafter, service assurance tests may be performed using that CM as a means of testing the selected MD. For example, cable modem 124 of FIG. 1 may be located and connected to MAC domain 114 so that service assurance tests may be performed on MAC domain 114 using cable modem 174. As with other typical cable modems, cable modem 124 may have one or more CPEs 126 located behind it in the cable network.

If additional service assurance tests are desired to be performed on a different MAC domain, then a CM (possibly cable modem 124 but it need not be) is connected to the new MAC domain to be tested, and the service assurance tests are performed using that CM to test the new MAC domain.

In legacy cable architectures, the CM involved in performing the service assurance tests is typically located at head end 110 rather than residing outside plant 160. Radio Frequency (RF) Splitter and Combiner 122 may be used in legacy cable architectures to adjust the particular MD to which a CM is connected.

Distributed Access Architecture (DAA) is a more recent cable architecture that decentralizes those functions typically performed at head end 110 so that those functions are relocated closer to the subscriber, typically at intelligent fiber nodes, such as fiber nodes 160, 170, and 180 shown in FIG. 1. A non-limiting, illustrative example of an intelligent fiber node is a Remote-PHY node in which one or more Remote PHY devices (RPDs) are deployed.

Performing a service assurance test in a DAA architecture presents challenges when the modulation is performed at a R-PHY device (RPD) deployed outside plant 160. When modulation is performed in the field at the RPD, the prior art approaches for adjusting to which MD a CM is connected that rely upon adjusting the modulation at head end 110 cannot be performed. In legacy cable architecture, an RF splitter in the head end may be used to connect a CM to a MD to perform a service assurance test on the MD. However, in a DAA, this cannot be performed because the RF is generated remotely in the field, and so there is no direct way to connect a CM residing at the head end to the particular MD desired to be tested Consequently, it is only possible to perform service assurance tests in a DAA architecture by placing a CM, and its associated customer premises equipment (CPE), downstream from or next to an intelligent fiber node. In other words, if the approach of FIG. 1 depicted a DAA, then a service assurance test would need to be performed by moving testing cable modem 124 (or whichever CM is used to perform the service assurance test) downstream or next to fiber node 170 to test set of cable modems 172.

Further, to perform a service assurance test on set of modems 182, cable modem 124 (or whichever CM is used to perform the service assurance test) would need to be moved downstream or next to fiber node 180 to facilitate the performance of the service assurance test. In the same way, to perform a service assurance test on set of modems 192, cable modem 124 (or whichever CM is used to perform the service assurance test) would need to be moved downstream or next to fiber node 190 to facilitate the performance of the service assurance test. Physically placing CMs and CPEs downstream or next to various fiber nodes in this manner is very challenging in many aspects, such as but not limited to scale, power, cooling, and size. Thus, the present state of the art suffers from many disadvantageous with respect to performing service assurance tests in a DAA.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for performing a service assurance test in a Distributed Access Architecture (DAA) are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Figure 1:
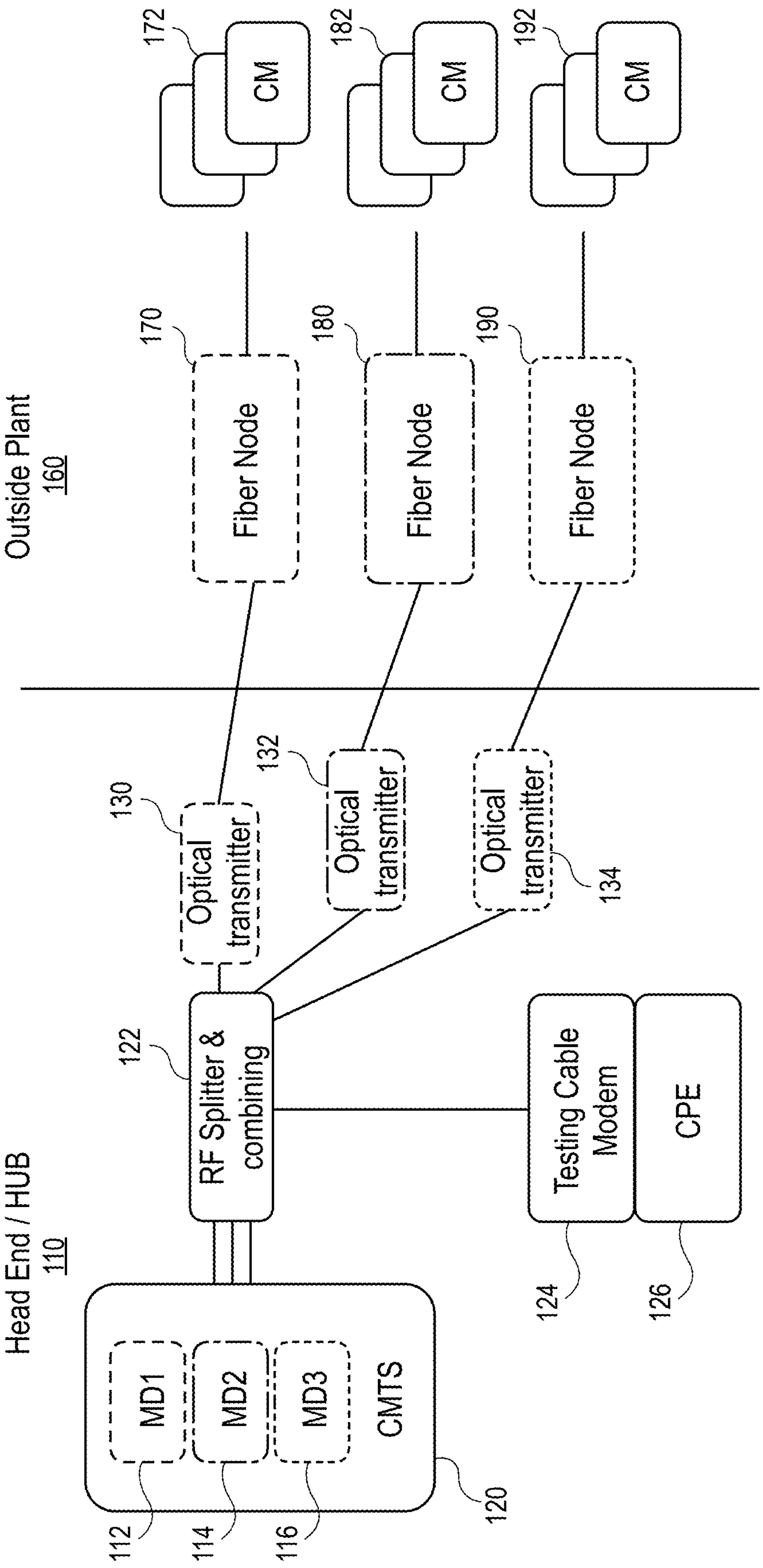
FIG. 1 (PRIOR ART)
FIG. 1 is an illustration of a legacy cable architecture upon which a service assurance test might be performed according to the prior.
Figure 2:
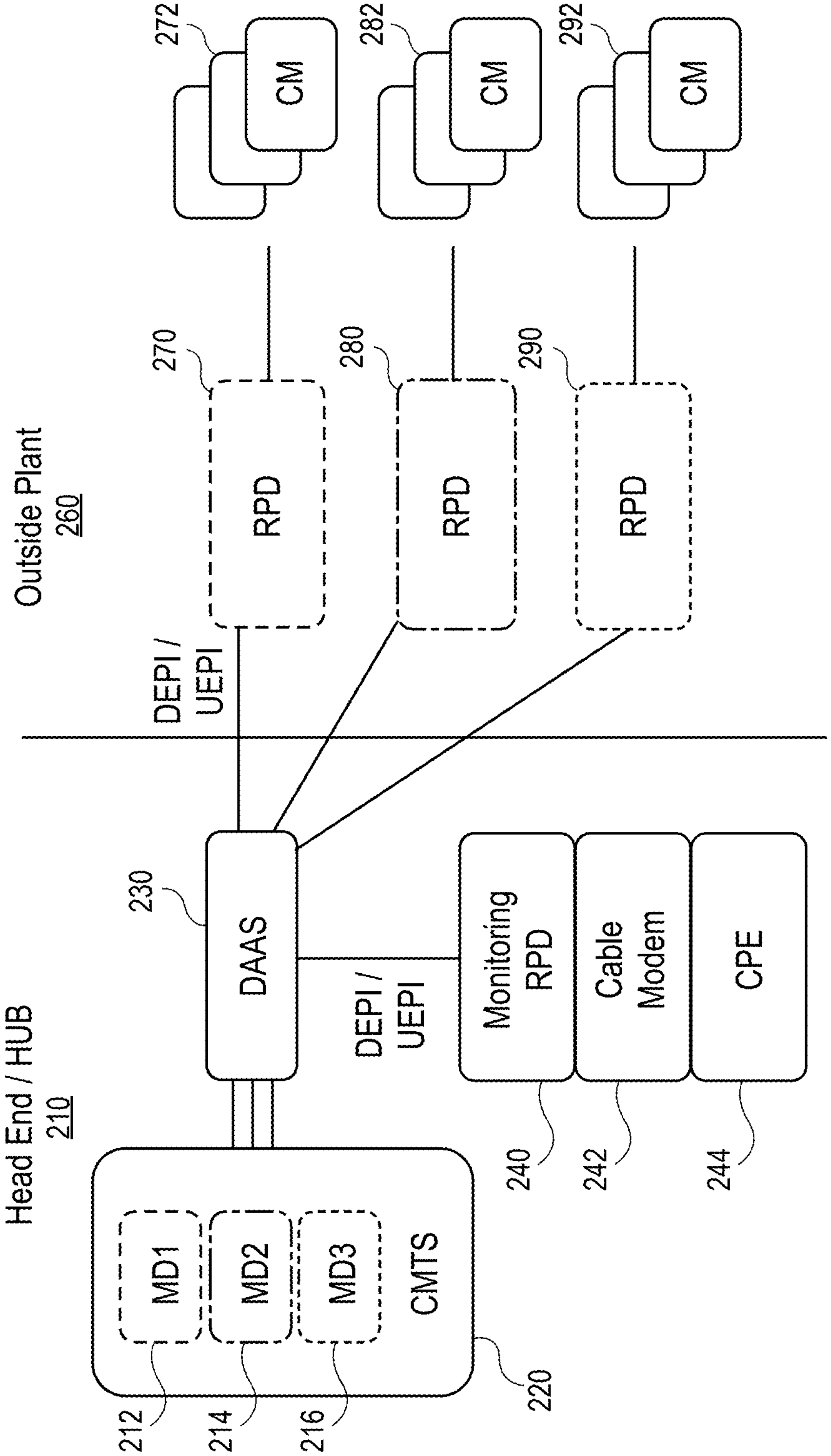
FIG. 2 is an illustration of a R-PHY Distributed Access Architecture (DAA) upon which a service assurance test may be performed in accordance with an embodiment of the invention.

Embodiments of the invention are discussed herein for performing service assurance tests in various modern network architectures, such as the R-PHY Distributed Access Architecture (DAA). FIG. 2 is an illustration of a R-PHY Distributed Access Architecture (DAA) upon which a service assurance test may be performed in accordance with an embodiment of the invention. FIG. 2 depicts head end 210 and outside plant 260. Head end 210 includes a Cable Modem Termination System (CMTS) 220 and a Distributed Access Architecture Switch (DAAS) 230. CMTS 220 may be implemented using either special purpose hardware, software that executes upon general purpose hardware, such as commercial off-the-shelf (COTS) computer systems, or a combination of both. As shown in FIG. 2, CMTS 220 operates using MAC domains 212, 214, and 216, although in an actual deployment any number of MAC domains may be used with CMTS 220.

DAAS 230 may be implemented using a switch that operates in accordance with the R-PHY Distributed Access Architecture (DAA) and is tasked with assisting the performance of service assurance testing. DAAS 230 will typically operate at head end 210; however, in other embodiments not depicted in FIG. 2, DAAS 230 may operate outside of head end 210, such as at a cloud service provider or other secured location. The only constraint on the location of DAAS 230 is it need be located upstream from RPD that assists with the service assurance testing.

Outside plant 260 comprises a plurality of Remote PHY devices (RPDs), such as RPD 270, 280, and 290. Each RPD may service a set of cable modems downstream. For example, RPD 270 services set of cable modems 272, RPD 280 services set of cable modems 282, and RPD 290 services set of cable modems 292.

Figure 3:
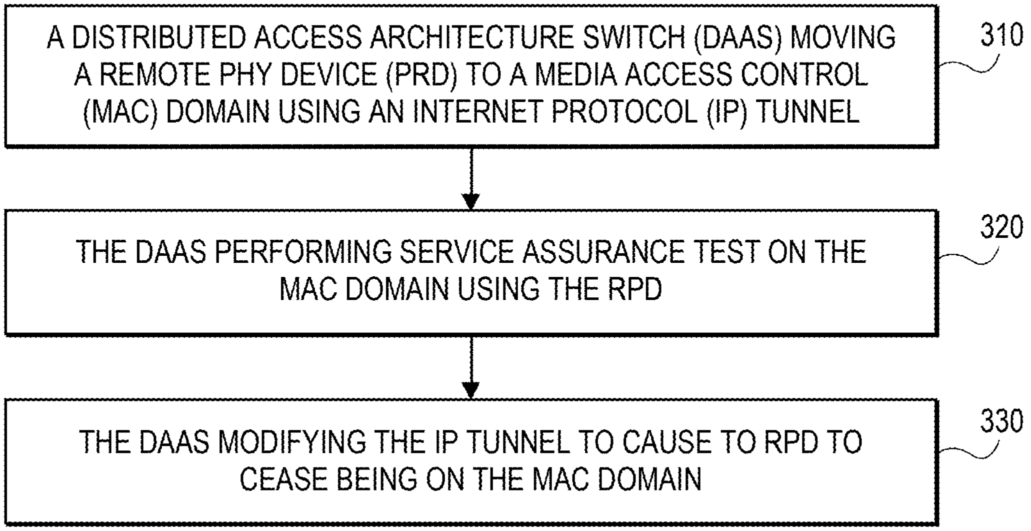
FIG. 3 is a flowchart illustrating the steps of performing a service assurance test according to an embodiment of the invention

The steps of performing a service assurance test according to an embodiment will be discussed in relation to FIG. 2 and to FIG. 3, which is a flowchart illustrating the steps of performing a service assurance test according to an embodiment of the invention. In step 310, DAAS 230 moves a RPD to a MAC domain using an Internet Protocol (IP) tunnel.

To perform a service assurance test using an embodiment of the invention, in step 310 an operator will first select a particular RPD connected to DAAS 230 for assistance in performing the service assurance testing. The RPD selected by the operator for this purpose is referred to herein as the "monitoring" RPD and is depicted in FIG. 2 as monitoring RPD 240. Also depicted in FIG. 2 is a cable modem 242 and customer premises equipment (CPE) 244 behind monitoring RPD 240 (i.e., downstream from the monitoring RPD), which may also be used in certain service assurance tests. Monitoring RPD 240 may reside in head end 210 or may reside in outside plant 260. CMs and CPEs may reside behind monitoring RPD 240; in other words, CMs and CPEs may reside downstream from the monitoring RPD.

In step 310, DAAS 230 moves a RPD to a MAC domain using an Internet Protocol (IP) tunnel. A feature called "virtual combining/splitting" is part of a DOCSIS specification supported by DAAS 230. The virtual combining/splitting feature allows more than one RPD to be connected into a single MD by combining several IP tunnels coming from different RPDs into a single MD. In this way, the operator may use the "virtual combining/splitting" capabilities of DAAS 230 to connect monitoring RPD 240 to any MD that the operator desires as there is no limit on how many RPDs may be connected to the MD desired to be tested.

An operator may configure and modify the Downstream External PHY Interface (DEPI) and the Downstream External PHY Interface (UEPI) end points (i.e., L2TP Control Connection Endpoint or (LCCE)) to create an IP tunnel to move monitoring RPD 240, as well as along with any CMs 242 and CPEs 244 behind it in the network layout, to the MD selected for testing.

Thereafter, in step 320, DAAS 230 performs the service assurance test on the desired MAC domain using monitoring RPD 240.

Thereafter, in step 330, DAAS 230 modifying the IP tunnel it created to cause the RPD to cease being on the MAC domain being tested. Note that step 330 is optional, as certain embodiments might allow the RPD to remain on the MAC domain for some time after the performance of the test.

It should be appreciated the monitoring RPD may be used to perform service assurance testing on multiple MDs. Also, it is also contemplated that embodiments may be used in Passive Optical Network (PON) and in OpenRAN (Radio Access Network) network architectures.

It is contemplated that RMD implementations may also benefit from embodiments of the invention. If a Remote MACPHY node (RMN) is configured to operate as an R-PHY node, then that node may be configured so that it can perform the functions of monitoring RPD 240 as if it were an RPD. This may be performed during a maintenance window (during periods of low activity) when switching the mode of a flexible RMN to operate as a RPD will cause minimal disruption.

The process of service assurance testing can be performed in a remote, automated, dynamic, and/or scheduled fashion. The results of the service assurance testing may be provided to customers, e.g., in a dashboard or other interface capable of providing value to a customer by interpreting the data and conveying the salient points in a manner designed to facilitate understanding.

A virtual test instance or other software entity may execute at head end 210 and/or a cloud service provider such as but not limited to a compute resource provider. The virtual test instance/software entity may periodically perform service assurance testing on a plurality of MDs. The results of service assurance testing may kickstart automated and/or manual investigations in how to address any identified issues within a MD.

The term "non-transitory computer-readable storage medium" as used herein refers to any tangible medium that participates in persistently storing instructions or operational guidance which may be provided to a processor for execution. Additional details about the operation of non-transitory computer-readable storage mediums may be found within U.S. Pat. No. 11,212,590, issued Dec. 28, 2021, entitled "Multiple Core Software Forwarding," the entire contents of which are hereby incorporated by reference for all purposes as if fully set forth herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent modification. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for performing a service assurance test, which when executed, cause:

a Distributed Access Architecture Switch (DAAS), disposed upstream from a Remote PHY Device (RPD), performing said service assurance test to verify a level of service presently provided to a MAC domain by performing:

(a) the DAAS moving said RPD to said MAC domain using an Internet Protocol (IP) tunnel;

(b) the DAAS performing said service assurance test on said MAC domain using said RPD; and (c) the DAAS modifying said IP tunnel to cause said RPD to cease being on said MAC domain.

2. The non-transitory computer-readable storage medium of claim 1, wherein the DAAS is disposed at a cable headend.

3. The non-transitory computer-readable storage medium of claim 1, wherein the DAAS creates said Internet Protocol (IP) tunnel to cause said RPD to move from a prior MAC domain to said MAC domain by modifying a Downstream External PHY Interface (DEPI) end point and a Downstream External PHY Interface (UEPI) end point.

4. The non-transitory computer-readable storage medium of claim 1, wherein said DAAS performs said service assurance test on a plurality of RPDs.

5. The non-transitory computer-readable storage medium of claim 1, wherein said DAAS performs said service assurance test on a plurality of RPDs that are each disposed on a different MAC domain.

6. The non-transitory computer-readable storage medium of claim 1, wherein said DAAS is disposed on a cable network, a Passive Optical Network (PON), or a Radio Access Network (OpenRAN).

7. An apparatus for performing a service assurance test, comprising:

one or more processors; and one or more non-transitory computer-readable storage mediums storing one or more sequences of instructions, which when executed, cause:

a Distributed Access Architecture Switch (DAAS), disposed upstream from a Remote PHY Device (RPD), performing said service assurance test to verify a level of service presently provided to a MAC domain by performing:

(a) the DAAS moving said RPD to said MAC domain using an Internet Protocol (IP) tunnel;

(b) the DAAS performing said service assurance test on said MAC domain using said RPD; and (c) the DAAS modifying said IP tunnel to cause said RPD to cease being on said MAC domain.

8. The apparatus of claim 7, wherein the DAAS is disposed at a cable headend.

9. The apparatus of claim 7, wherein the DAAS creates said Internet Protocol (IP) tunnel to cause said RPD to move from a prior MAC domain to said MAC domain by modifying a Downstream External PHY Interface (DEPI) end point and a Downstream External PHY Interface (UEPI) end point.

10. The apparatus of claim 7, wherein said DAAS performs said service assurance test on a plurality of RPDs.

11. The apparatus of claim 7, wherein said DAAS performs said service assurance test on a plurality of RPDs that are each disposed on a different MAC domain.

12. The apparatus of claim 7, wherein said DAAS is disposed on a cable network, a Passive Optical Network (PON), or a Radio Access Network (OpenRAN).

13. A method for performing a service assurance test, comprising:

a Distributed Access Architecture Switch (DAAS), disposed upstream from a Remote PHY Device (RPD), performing said service assurance test to verify a level of service presently provided to a MAC domain by performing:

(a) the DAAS moving said RPD to said MAC domain using an Internet Protocol (IP) tunnel;

(b) the DAAS performing said service assurance test on said MAC domain using said RPD; and (c) the DAAS modifying said IP tunnel to cause said RPD to cease being on said MAC domain.

14. The method of claim 13, wherein the DAAS is disposed at a cable headend.

15. The method of claim 13, wherein the DAAS creates said Internet Protocol (IP) tunnel to cause said RPD to move from a prior MAC domain to said MAC domain by modifying a Downstream External PHY Interface (DEPI) end point and a Downstream External PHY Interface (UEPI) end point.

16. The method of claim 13, wherein said DAAS performs said service assurance test on a plurality of RPDs.

17. The method of claim 13, wherein said DAAS performs said service assurance test on a plurality of RPDs that are each disposed on a different MAC domain.

18. The method of claim 13, wherein said DAAS is disposed on a cable network, a Passive Optical Network (PON), or a Radio Access Network (OpenRAN).

* * * * *